United States Patent
Daoud et al.

(10) Patent No.: US 11,737,046 B2
(45) Date of Patent: *Aug. 22, 2023

(54) SYSTEMS AND METHODS FOR USING OUT-OF-BAND SPECTRUM FOR SHARED SPECTRUM REGISTRATION AND INCREASED LINK RELIABILITY AND CAPACITY

(71) Applicant: Charter Communications Operating, LLC, St. Louis, MO (US)

(72) Inventors: Mohamed Daoud, Englewood, CO (US); Akram Hassanien, Plano, TX (US); Hossam Hmimy, Aurora, CO (US); Umamaheswar Kakinada, Centennial, CO (US); Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/307,133

(22) Filed: May 4, 2021

(65) Prior Publication Data

US 2021/0258910 A1    Aug. 19, 2021

Related U.S. Application Data

(63) Continuation of application No. 16/564,409, filed on Sep. 9, 2019, now Pat. No. 11,032,786.

(51) Int. Cl.
*H04W 60/04* (2009.01)
*H04W 52/24* (2009.01)
*H04W 72/56* (2023.01)
*H04W 72/541* (2023.01)

(52) U.S. Cl.
CPC ......... *H04W 60/04* (2013.01); *H04W 52/243* (2013.01); *H04W 72/541* (2023.01); *H04W 72/56* (2023.01)

(58) Field of Classification Search
CPC . H04W 60/04; H04W 52/243; H04W 72/082; H04W 72/10
See application file for complete search history.

(56) References Cited

U.S. PATENT DOCUMENTS

| | | | |
|---|---|---|---|
| 10,271,351 B1 * | 4/2019 | Wang | H04L 5/0091 |
| 10,419,943 B1 * | 9/2019 | Wong | H04W 16/28 |
| 2017/0238342 A1 | 8/2017 | Yang et al. | |

(Continued)

*Primary Examiner* — John J Lee
(74) *Attorney, Agent, or Firm* — Young Basile Hanlon & MacFarlane, P.C.

(57) ABSTRACT

Disclosed herein are methods and systems for using out-of-band spectrum for shared spectrum registration and increased link reliability and capacity. A method for customer premise equipment (CPE) attachment and registration in a shared spectrum system includes attaching, by the CPE to a shared spectrum access point, using an out-of-band spectrum, where the out-of-band spectrum is out-of-band with respect to a shared spectrum of the shared spectrum system, registering, by the CPE with a spectrum access system, using the out-of-band spectrum upon successful attachment with the shared spectrum access point, and communicating, by the CPE, using at least the shared spectrum upon successful registration with the spectrum access system.

18 Claims, 10 Drawing Sheets

(56) References Cited

U.S. PATENT DOCUMENTS

| | | |
|---|---|---|
| 2018/0070242 A1 | 3/2018 | Damnjanovic et al. |
| 2019/0120969 A1* | 4/2019 | Hamzeh ............... H04J 11/0073 |
| 2019/0373610 A1 | 12/2019 | Cimpu et al. |
| 2020/0059795 A1 | 2/2020 | Kakinada et al. |

* cited by examiner

SYSTEMS AND METHODS FOR USING OUT-OF-BAND SPECTRUM FOR SHARED SPECTRUM REGISTRATION AND INCREASED LINK RELIABILITY AND CAPACITY

CROSS REFERENCE TO RELATED APPLICATION(S)

This application claims priority to and the benefit of U.S. application Ser. No. 16/564,409, filed on Sep. 9, 2019, the entire disclosure of which is hereby incorporated by reference.

TECHNICAL FIELD

This disclosure relates to wireless communications. More specifically, this disclosure relates to shared spectrum registration and increased link reliability and capacity.

BACKGROUND

Wireless telecommunications or radio access technologies (RATs) generally use licensed radio frequency spectrum for communications between mobile devices and wireless telecommunications networks. Licensed spectrum and unlicensed spectrum may be used for third generation (3G) and fourth generation (4G) wireless communications.

Citizens Broadband Radio Service (CBRS) spectrum is a type of shared spectrum, license-by-rule spectrum, or lightly licensed spectrum which is shared between multiple entities including government users (such as the military), licensed users, and non-licensed users. For example, shared spectrum may be used for fixed wireless access networks. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity.

The SAS authorizes or grants spectrum to access points known as CBRS Devices (CBSDs) and performs interference management to protect higher tier users. Typically, a shared spectrum access point registers with the SAS and receives a spectrum grant. Devices may then attach to the registered access points. Once the device is attached to the registered access point, the device then registers with the SAS. However, the device is limited to an initial transmission power level which may not be sufficient for attachment.

SUMMARY

Disclosed herein are methods and systems for using out-of-band spectrum for shared spectrum registration and increased link reliability and capacity. In an implementation, a method for customer premise equipment (CPE) attachment and registration in a shared spectrum system includes attaching, by the CPE to a shared spectrum access point, using an out-of-band spectrum, where the out-of-band spectrum is out-of-band with respect to a shared spectrum of the shared spectrum system, registering, by the CPE with a spectrum access system, using the out-of-band spectrum upon successful attachment with the shared spectrum access point, and communicating, by the CPE, using at least the shared spectrum upon successful registration with the spectrum access system. In an implementation, the method further includes maintaining, by the CPE, communications using the out-of-band spectrum. In an implementation, the method further includes aggregating, by the CPE, shared spectrum data and out-of-band spectrum data to increase link reliability, capacity, and throughput.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
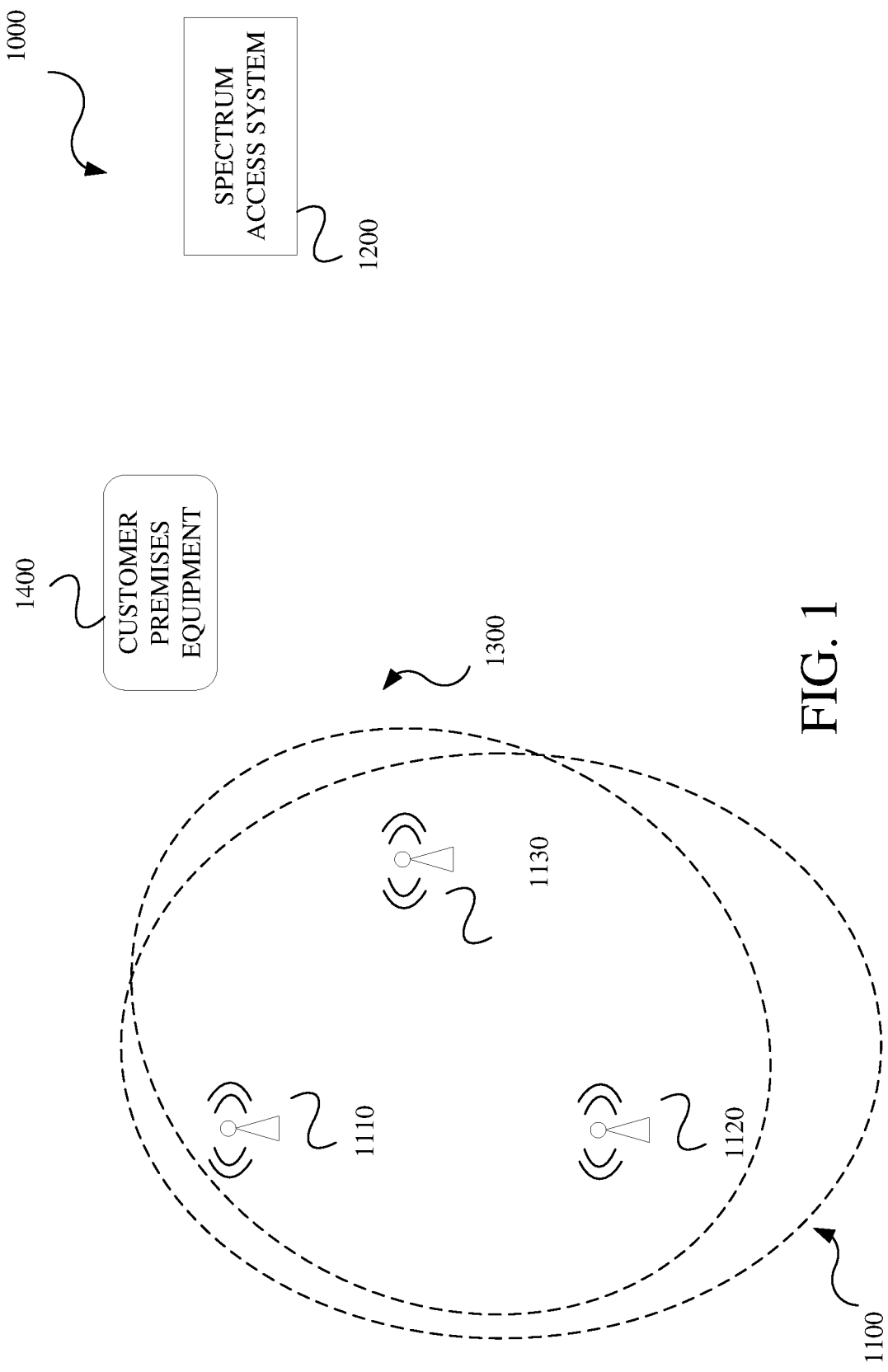
FIG. 1 is a diagram of an example of a wireless network such as a citizens broadband radio service (CBRS) network with a customer premises equipment (CPE) in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 8:
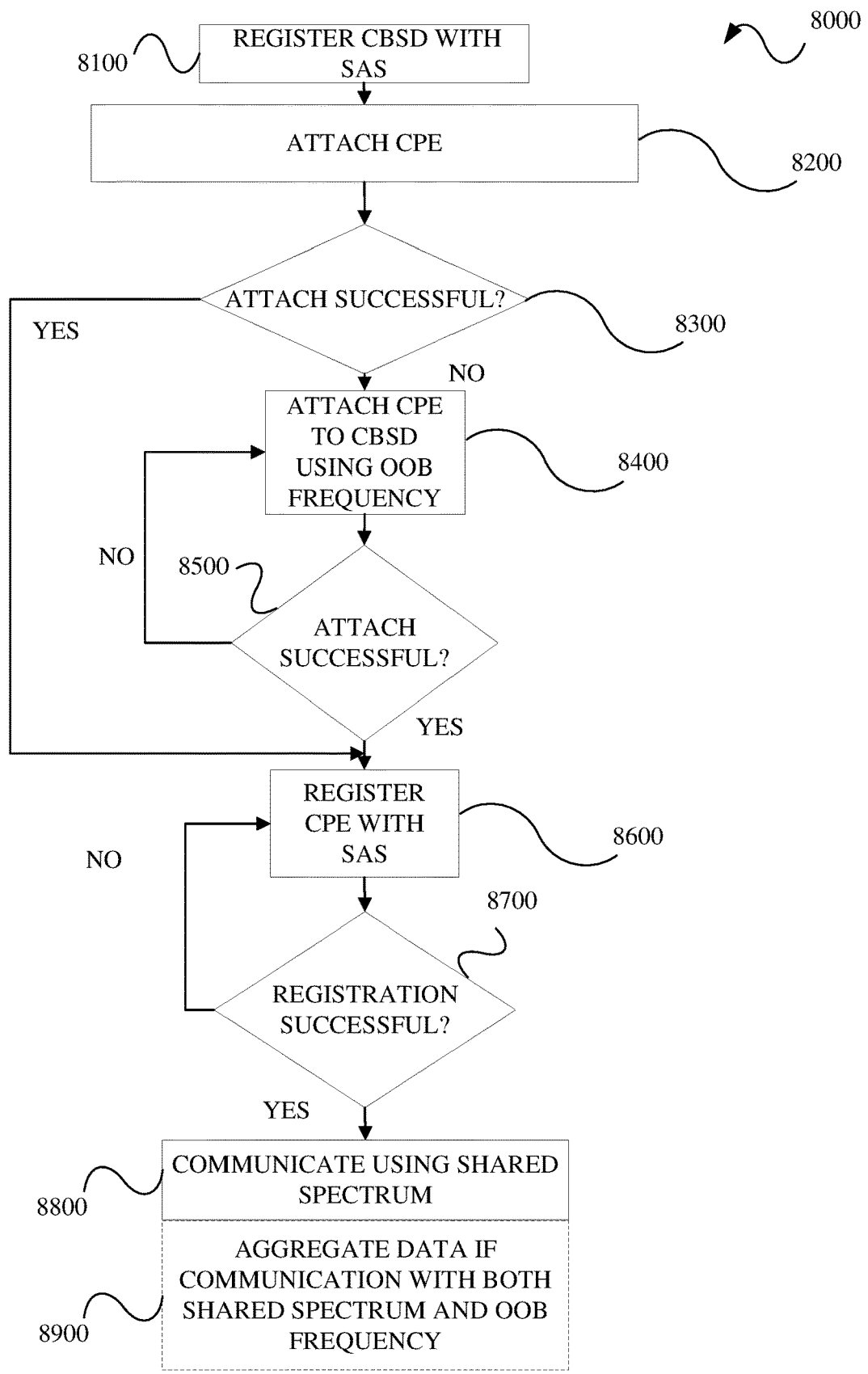
FIG. 8 is a flowchart of an example method for out-of-band attachment and registration and increased link reliability and capacity in accordance with embodiments of this disclosure.
Figure 9:
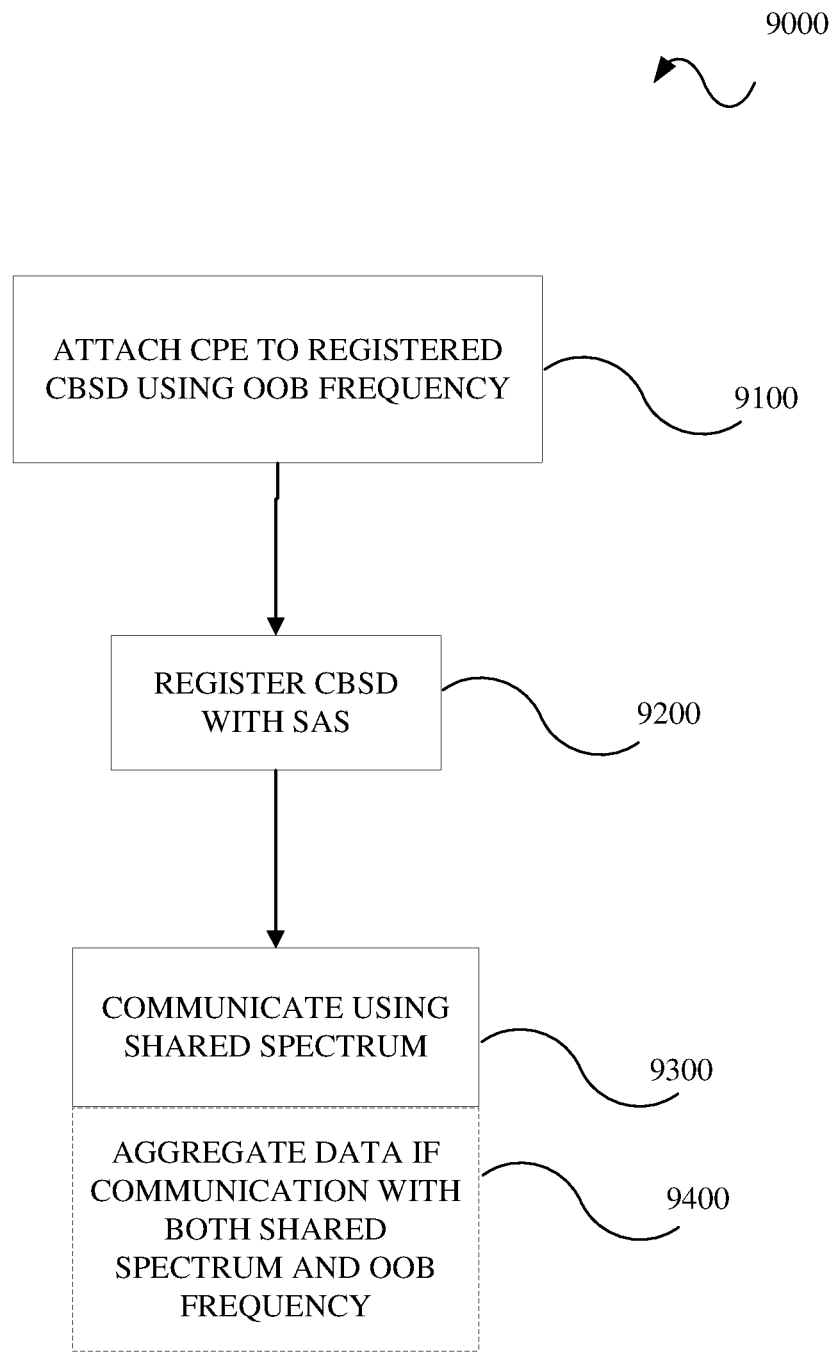
FIG. 9 is a flowchart of an example method for out-of-band attachment and registration and increased link reliability and capacity in accordance with embodiments of this disclosure.
Figure 10:
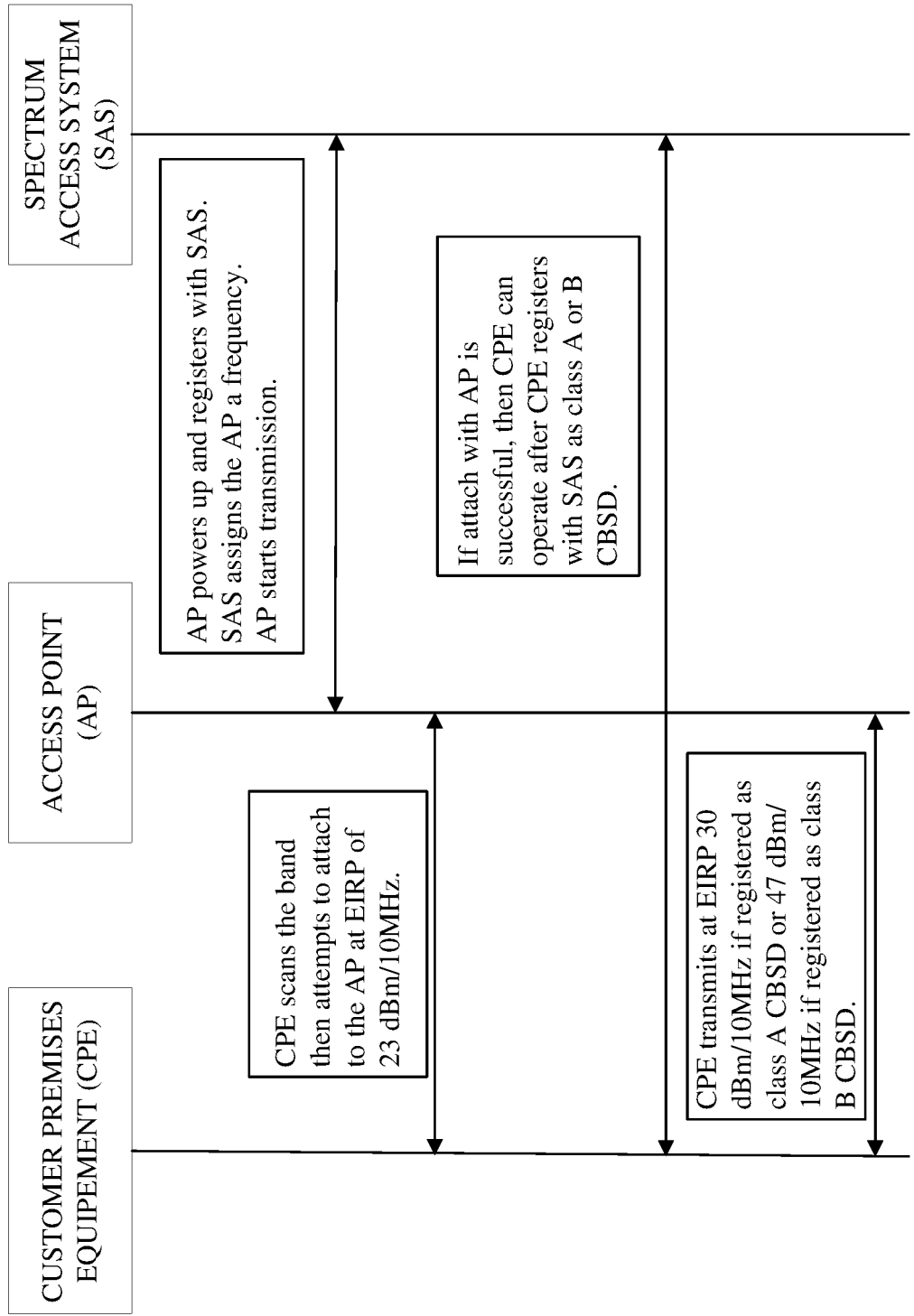
FIG. 10 is a flow diagram of typical attachment and registration.

FIG. 10 is a flow diagram of a customer premises equipment (CPE) attachment and registration in a Citizens Broadband Radio Service (CBRS) system without use of the systems, devices, and methods described herein with respect to FIGS. 1-9. In the CBRS system, CPE's are treated as category A or B CBRS devices (CBSDs), both of which have to register with a spectrum access system (SAS). Shared spectrum access points (APs) known as CBSDs in CBRS systems also have to register with the SAS. Initially, the AP registers with the SAS and is assigned a frequency. The CPE then attempts to attach to the registered AP. The CPE has to use an initial transmission power or Equivalent Isotropically Radiated Power (EIRP) to attach to the registered AP. As shown in Table 1, the initial transmission power for the CPE (treated as an end user device) in this case, is 23 dBm/10 MHz. Once the CPE has attached to the registered AP, the CPE then registers with the SAS and once registered, can operate at higher transmission powers as shown in Table 1.

TABLE 1

| DEVICE | Maximum EIRP (dBm/10 MHz) |
|---|---|
| End User Device | 23 |
| Category A CBSD | 30 |
| Category B CBSD | 47 |

Problematically, the initial transmission power used in the method shown in FIG. 10 may be too low for successful attachment to registered APs. Consequently, this results in CPEs not being able to attach to a registered AP even though the CPE is in the AP's coverage area. This is especially a problem in rural areas where the APs are not effectively able to provide sufficient coverage area due to the initial transmission power level requirements.

Disclosed herein are methods and systems for using out-of-band (OOB) spectrum for shared spectrum registration and increased link reliability and capacity. In an implementation, the shared, licensed-by-rule, or lightly licensed spectrum (where "shared" is used herein for illustrative and description purposes as appropriate) may be, for example, a Citizens Broadband Radio Service (CBRS) spectrum, which is controlled by a spectrum access system or server (SAS). The low initial transmission power limitations or restrictions may be addressed by using OOB spectrum to attach to a shared spectrum access point which is registered with the SAS, where the OOB spectrum is out-of-band with respect to the shared spectrum of a shared spectrum system. In an implementation, the OOB spectrum allows use of greater transmission power than that allowed by the shared spectrum. In an implementation, the OOB spectrum is not transmission power limited for the initial attachment process.

In an implementation, a CPE may use OOB spectrum for the attachment procedure with a registered shared spectrum access point. In an implementation, the OOB spectrum may be Industrial, Scientific, and Medical (ISM) spectrum. In an implementation, the OOB spectrum may be Television White Space (TVWS) spectrum. In an implementation, the OOB spectrum may be licensed spectrum. In an implementation, the OOB spectrum may be another shared, licensed-by-rule, or lightly licensed spectrum. In an implementation, the OOB spectrum is out-of-band with respect to a shared, licensed-by-rule, or lightly licensed spectrum of a shared, licensed-by-rule, or lightly licensed spectrum system. After successful attachment with the registered shared spectrum access point, the CPE registers with the SAS as a registered device type using the OOB spectrum. After successful registration with the SAS, the CPE may transmit using the higher transmit power levels associated with the registered device type.

In an implementation, a CPE which has successfully attached with a registered shared spectrum access point and successfully registered with a SAS may aggregate OOB spectrum data with shared spectrum data to increase link reliability and capacity. In an implementation, a router or a switch may be used to implement data aggregation. In an implementation, the data aggregation may be done at the Transmission Control Protocol (TCP) layer. In an implementation, carrier aggregation may be used for data aggregation if the OOB spectrum is a Long-Term Evolution (LTE) spectrum.

FIG. 1 is a diagram of an example architecture 1000 for using out-of-band (OOB) spectrum 1300 for shared spectrum registration and increased link reliability and capacity. In an implementation, the architecture 1000 may include a wireless network such as a citizens broadband radio service (CBRS) network 1100, where the CBRS network 1100 is an example or type of shared, licensed-by-rule, or lightly licensed spectrum system. The CBRS network 1100 may provide wireless coverage on a CBRS spectrum using one or more CBSDs 1110, 1120, and 1130. The number of CBSDs is illustrative and the CBRS network 1100 may include more or less CBSDs. The architecture 1000 may include a SAS 1200 which is connected to or in communication (collectively "in communication with") with each of the CBSDs 1110, 1120, and 1130. A customer premises equipment (CPE) 1400 may be in communication with one or more of the CBSDs 1100, 1110, and 1120.

The communications between particular CBSDs 1100, 1110, and 1120, the SAS 1200, and the CPE 1300 may include wired communications, wireless communications, or a combination thereof, as appropriate. In an implementation, the architecture 1000 may execute the techniques described in FIGS. 5-9. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The CBSDs 1110, 1120, and 1130 are a type of radio concentration station which may include shared spectrum access points, base stations, eNodeBs, and the like, which enables radio communications access between, for example, the CPE 1400 to other devices. CBSD is used herein for purposes of illustration and description. Each CBSD 1110, 1120, and 1130 may be authorized and granted spectrum allocation by the SAS 1200. Each CBSD 1110, 1120, and 1130 may have one or more sectors which provide wireless communications coverage. The CBSDs 1110, 1120, and 1130 may be provisioned for operation with the CBRS network 1100 and the OOB spectrum 1300. In an implementation, the CBSDs 1110, 1120, and 1130 may be provisioned for data aggregation operation using the CBRS spectrum and the OOB spectrum 1300.

The SAS 1200 enables access to the CBRS spectrum and dynamically manages the spectrum for optimal use, efficiency, and compliance with CBRS rules. The SAS 1200 communicates with each CBSD for registration, grant allocation/deallocation and interference management. The SAS 1200 communicates with each CPE for registration.

The OOB spectrum 1300 may be another shared spectrum, unlicensed spectrum, ISM spectrum, TVWS spectrum, and/or licensed spectrum. In general, and as used in the description herein, the OOB spectrum 1300 refers to spectrum which is out-of-band with respect to a shared spectrum of the shared spectrum system for which the CPE 1400 is attempting to attach and register with or gain access to.

The CPE 1400 may be, but is not limited to, end user devices, telephones, routers, network switches, gateways, set-top boxes, fixed mobile convergence products, home networking adapters and Internet access gateways that enable customers to access a service provider's services and distribute them in a residence, enterprise, office, or like infrastructure. In an implementation, the CPE 1400 may be equipment located at a customer's premises and connected with a service provider's telecommunication equipment. The CPE 1400 may be provisioned for operation with the CBRS network 1100 and the OOB spectrum 1300. In an implementation, the CPE 1400 may be provisioned for data aggregation operation with the CBRS spectrum and the OOB spectrum 1300.

Figure 2:
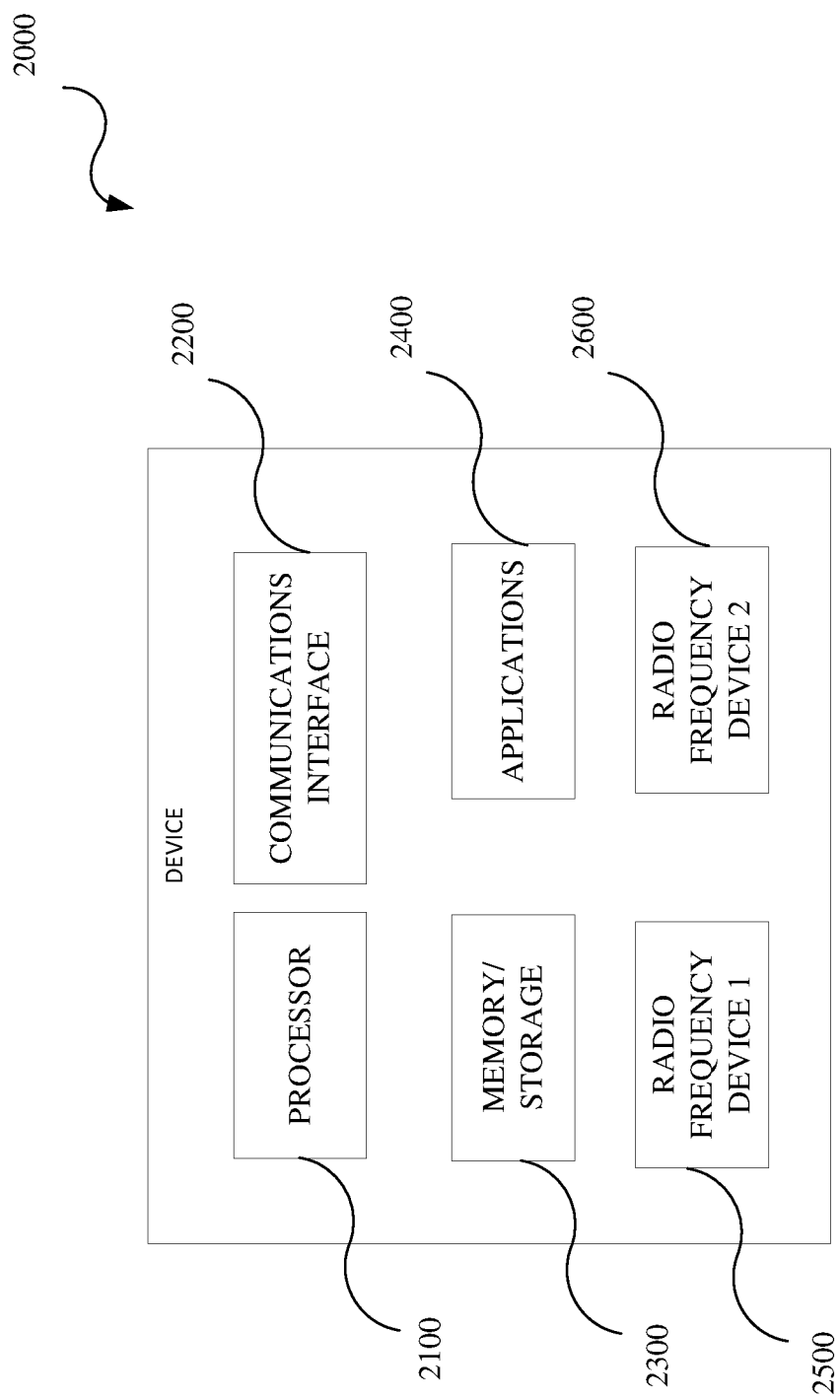
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a communication interface 2200, a memory/storage 2300, applications 2400, a radio frequency device 1 2500, and a radio frequency device 2 2600. The device 2000 may include or implement, for example, the CPE 1400 and the CBSDs 1110, 1120, and 1130. The applicable or appropriate techniques or methods as described with respect to FIGS. 5-9 may be stored in the memory/storage 2300 and executed by the processor 2100 in cooperation with the memory/storage 2300, the communications interface 2200, the applications 2400, the radio frequency device 1 2500, and the radio frequency device 2 2600 as appropriate. In an implementation, the radio frequency device 1 2500 may be provisioned for operation with the shared spectrum such as the CBRS spectrum or the like as operated by a service provider, and the radio frequency device 2 2600 may be provisioned for operation with the OOB spectrum 1300. In an implementation, the number of radio frequency devices is illustrative and may include more than two radio frequency devices. In an implementation, the radio frequency device 2 2600 and/or other radio frequency devices may be provisioned for operation with any combination of access technologies, channels, bandwidths, frequencies, and the like that may be used for the OOB spectrum 1300. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
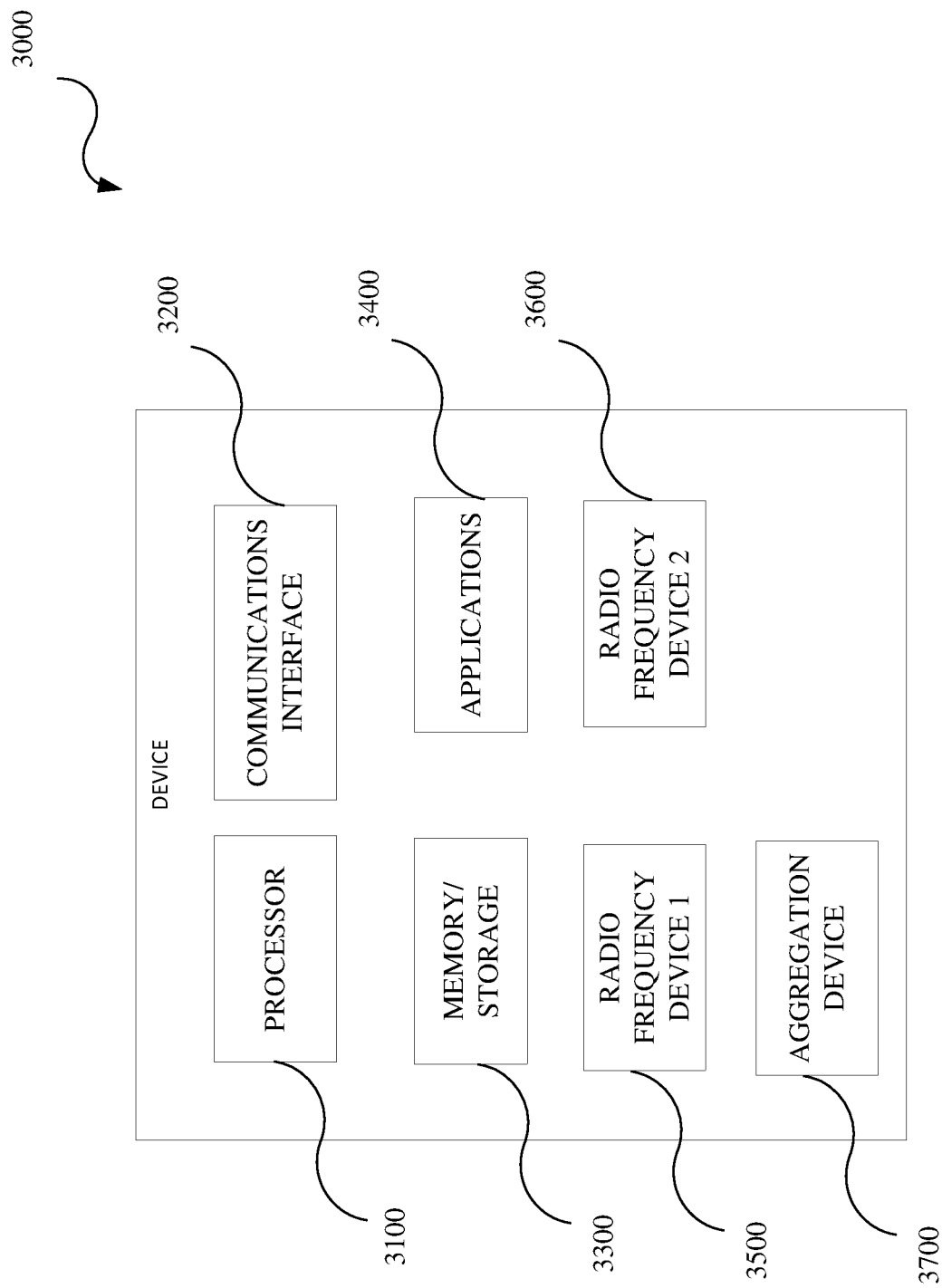
FIG. 3 is a block diagram of an example of another device in accordance with embodiments of this disclosure.

FIG. 3 is a block diagram of an example of a device 3000 in accordance with embodiments of this disclosure. The device 3000 may include, but is not limited to, a processor 3100, a communication interface 3200, a memory/storage 3300, applications 3400, a radio frequency device 1 3500, a radio frequency device 2 3600, and an aggregation device 3700. The device 3000 may include or implement, for example, the CPE 1400 and the CBSDs 1110, 1120, and 1130. The applicable or appropriate techniques or methods as described with respect to FIGS. 5-9 may be stored in the memory/storage 3300 and executed by the processor 3100 in cooperation with the memory/storage 3300, the communications interface 3200, the applications 3400, the radio frequency device 1 3500, the radio frequency device 2 3600, and the aggregation device 3700 as appropriate. In an implementation, the radio frequency device 1 3500 may be provisioned for operation with the shared spectrum such as the CBRS spectrum or the like as operated by a service provider, and the radio frequency device 2 3600 may be provisioned for operation with the OOB spectrum 1300. In an implementation, the number of radio frequency devices is illustrative and may include more than two radio frequency devices. In an implementation, the radio frequency device 2 3600 and/or other radio frequency devices may be provisioned for operation with any combination of access technologies, channels, bandwidths, frequencies, and the like that may be used for the OOB spectrum 1300. In an implementation, the aggregation device 3700 may be used to increase link reliability by aggregating data available via the CBRS spectrum and data available via the OOB spectrum 1300. The aggregation device 3700 may be a switch, a router, or like device. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
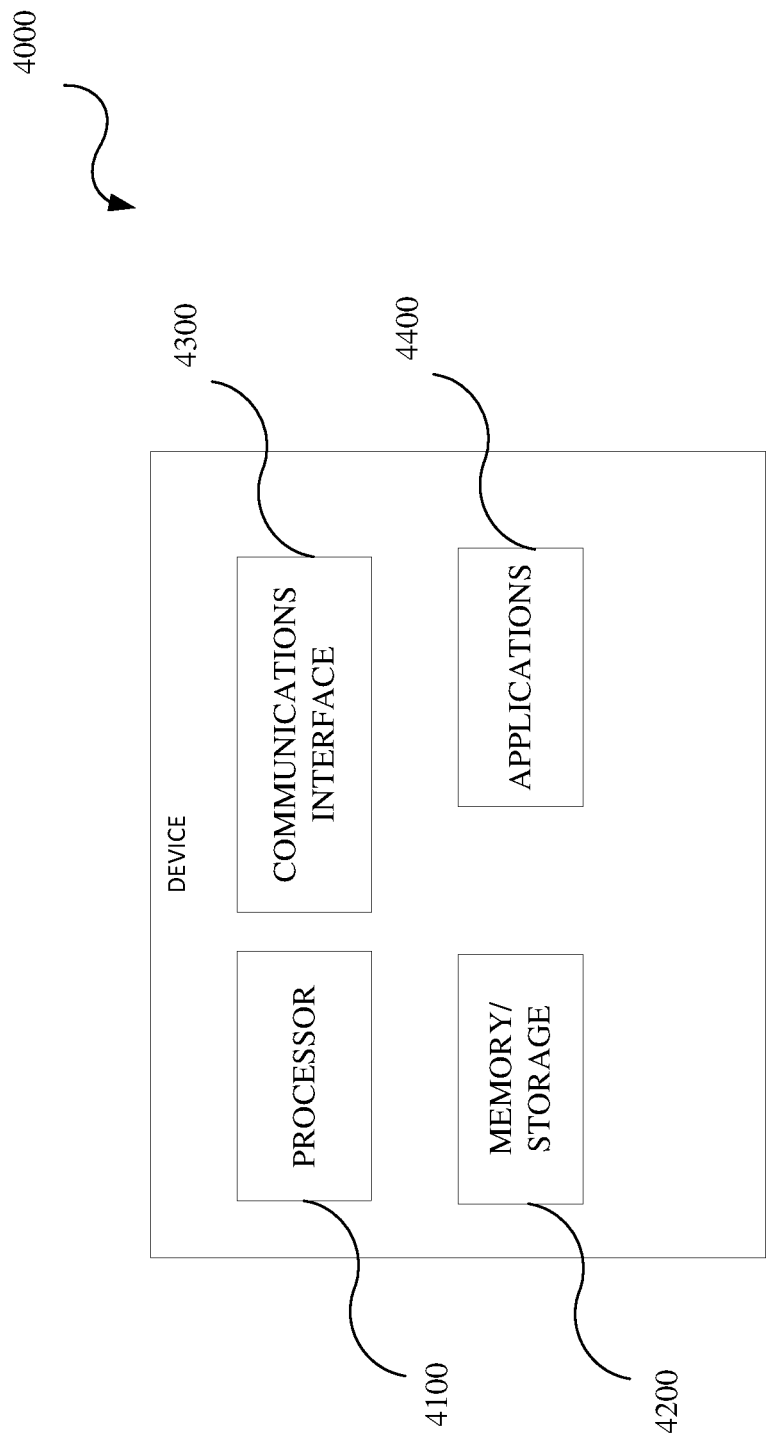
FIG. 4 is a block diagram of an example of a spectrum access server or system (SAS) in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. The device 4000 may include or implement, for example, the SAS 1200. In an implementation, the memory/storage 4200 may store an interference map, spectrum allocations, and other information. The applicable or appropriate techniques or methods described with respect to FIGS. 5-9 may be stored in the memory/storage 4200 and executed by the processor 4100 in cooperation with the memory/storage 4200, the communications interface 4300, and the applications 4400 as appropriate. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Operationally with respect to FIGS. 1-4, and as described in detail herein below, the SAS 1200 may grant CBRS spectrum to each activated CBSD, such as the CBSDs 1110, 1120, and 1130. The CBSDs 1110, 1120, and 1130 may in turn establish the wireless coverage of CBRS network 1100 using a first radio device, for example. A CPE 1400 may attempt to attach to one of the CBSDs 1110, 1120, and 1130 using the OOB spectrum 1300 and a second radio device, for example. Upon a successful attachment with one of the CBSDs 1110, 1120, and 1130, the CPE 1400 may then attempt to register with the SAS 1200 as a CBSD device using the OOB spectrum 1300. In an implementation, registration using the OOB spectrum 1300 can be done via one of the CBSDs 1110, 1120, and 1130. In an implementation, registration using the OOB spectrum 1300 can be done via a device which operates on the OOB spectrum or frequency. In an implementation, the device may or may not be collocated with one of the CBSDs 1110, 1120, and 1130. Upon a successful registration with the SAS 1200, the CPE 1400 may then transmit at transmit power levels determined by type of CBSD device. In an implementation, the CPE 1400 may communicate on both the CBRS spectrum and the OOB spectrum 1300 to increase link reliability and capacity. In an implementation, a data aggregator, for example, may be used to aggregate the two data streams. In an implementation, if the OOB spectrum is a LTE spectrum, carrier aggregation techniques may be used to aggregate the two data streams.

Figure 5:
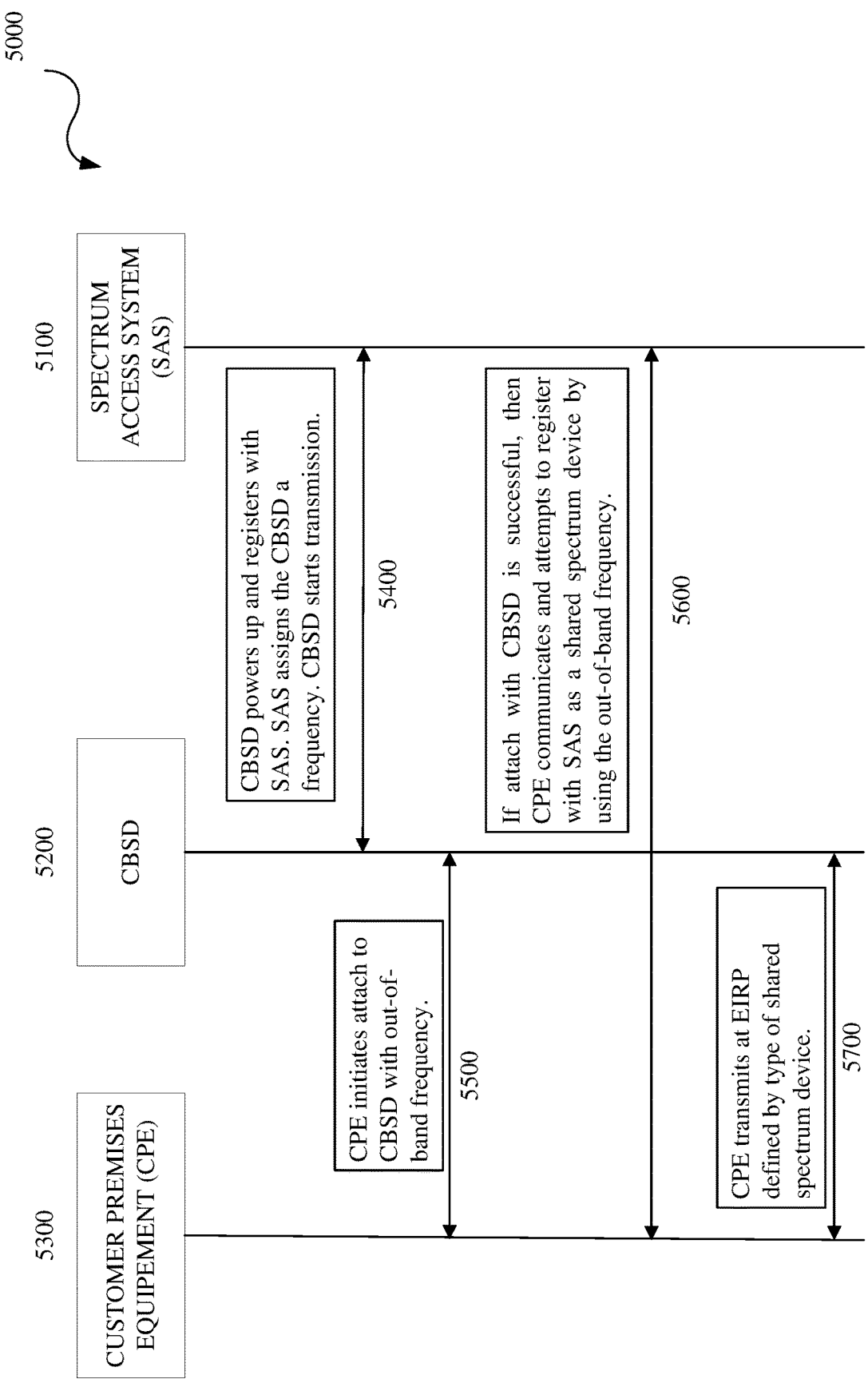
FIG. 5 is a flow diagram of an example of out-of-band attachment and registration in accordance with embodiments of this disclosure.

FIG. 5 is a flow diagram 5000 of an example of CPE attachment and registration in accordance with embodiments of this disclosure. The flow diagram 5000 describes communications and events with respect to a SAS 5100, a CBSD 5200, and a CPE 5300. Initially, the CBSD 5200 may attempt to register with the SAS 1200 after the CBSD 5200 powers up (5400). The CPE 5300 may initiate an attach to the CBSD 5200 using an OOB spectrum or frequency (5500). If attachment with the CBSD 5200 is successful, the CPE 5300 may attempt to register with the SAS 5100 using the OOB spectrum or frequency (5600) via the CBSD 5200. In an implementation, registration using the OOB spectrum or frequency can be done via a device which operates on the OOB spectrum or frequency. In an implementation, the device may or may not be collocated with the CBSD 5200. The CPE 5300 may register as one of multiple shared spectrum device types, where each shared spectrum device type may have a defined transmit power level. If the registration is successful, the CPE 5300 may then transmit, communicate, and/or operate in accordance with the registered shared spectrum device type (5700). For example, in an implementation, the CPE 5300 transmits at EIRP according to Federal Communications Commission (FCC) part 96 rules.

Figure 6:
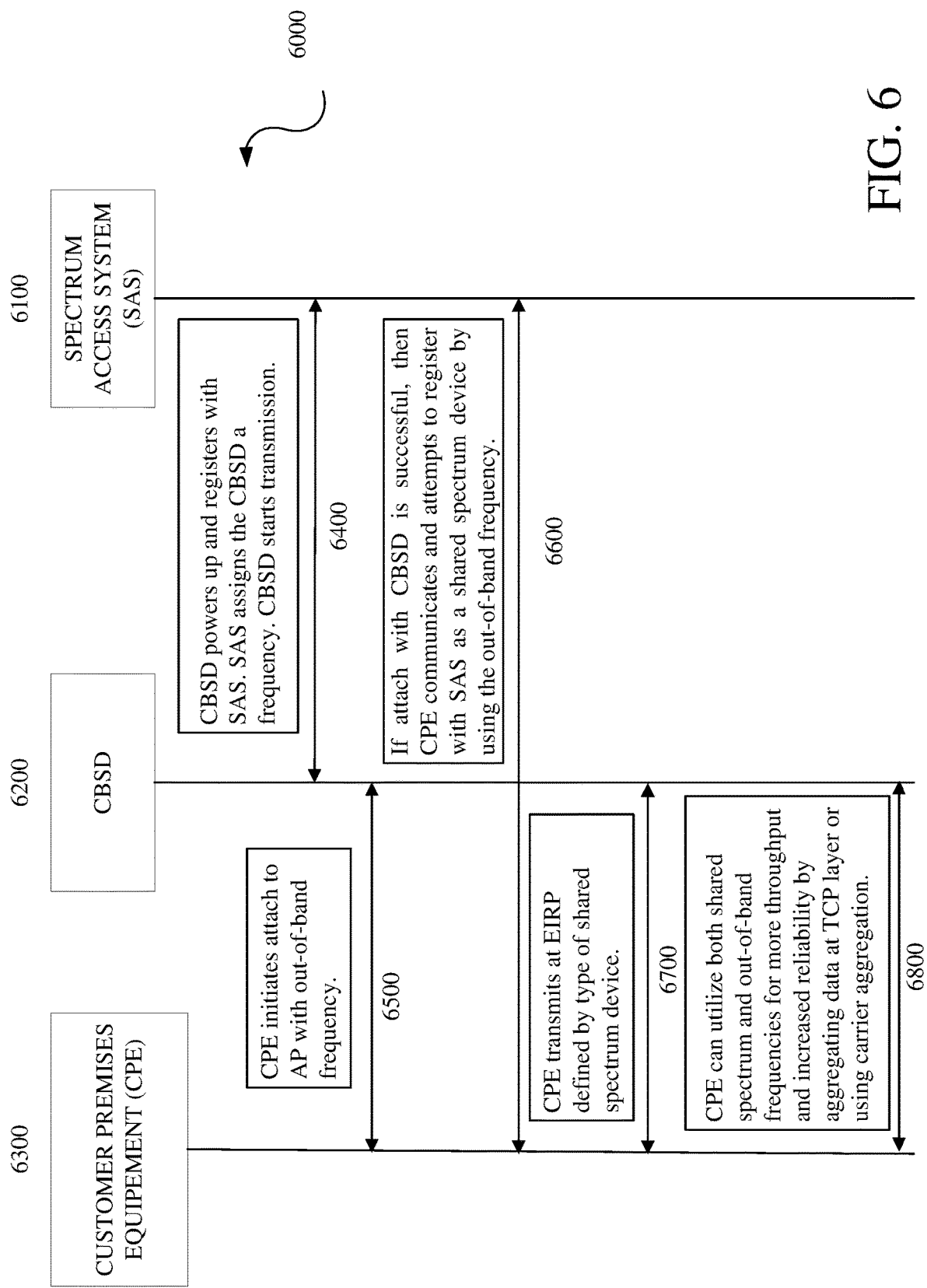
FIG. 6 is a flow diagram of an example of out-of-band attachment and registration and increased link reliability and capacity in accordance with embodiments of this disclosure.

FIG. 6 is a flow diagram 6000 of an example of CPE attachment and registration and increased link reliability and capacity in accordance with embodiments of this disclosure. The flow diagram 6000 describes communications and events with respect to a SAS 6100, a CBSD 6200, and a CPE 6300. Initially, the CBSD 6200 may attempt to register with the SAS 1200 after the CBSD 6200 powers up (6400). The CPE 6300 may initiate an attach to the CBSD 6200 using an OOB spectrum or frequency (6500). If attachment with the CBSD 6200 is successful, the CPE 6300 may attempt to register with the SAS 6100 using the OOB spectrum or frequency (6600). In an implementation, registration using the OOB spectrum can be done via the CBSD 6200. In an implementation, registration using the OOB spectrum can be done via a device which operates on the OOB spectrum or frequency. In an implementation, the device may or may not be collocated with the CBSD 6200. The CPE 6300 may register as one of multiple shared spectrum device types, where each shared spectrum device type may have a defined transmit power level. If the registration is successful, the CPE 6300 may then transmit, communicate, and/or operate in accordance with the registered shared spectrum device type (6700). For example, in an implementation, the CPE 6300 transmits at EIRP according to Federal Communications Commission (FCC) part 96 rules. The CPE 6300 may continue transmitting, communicating, and/operating on the OOB spectrum to increase link reliability and capacity by using data aggregation techniques as described herein (6800).

Figure 7:
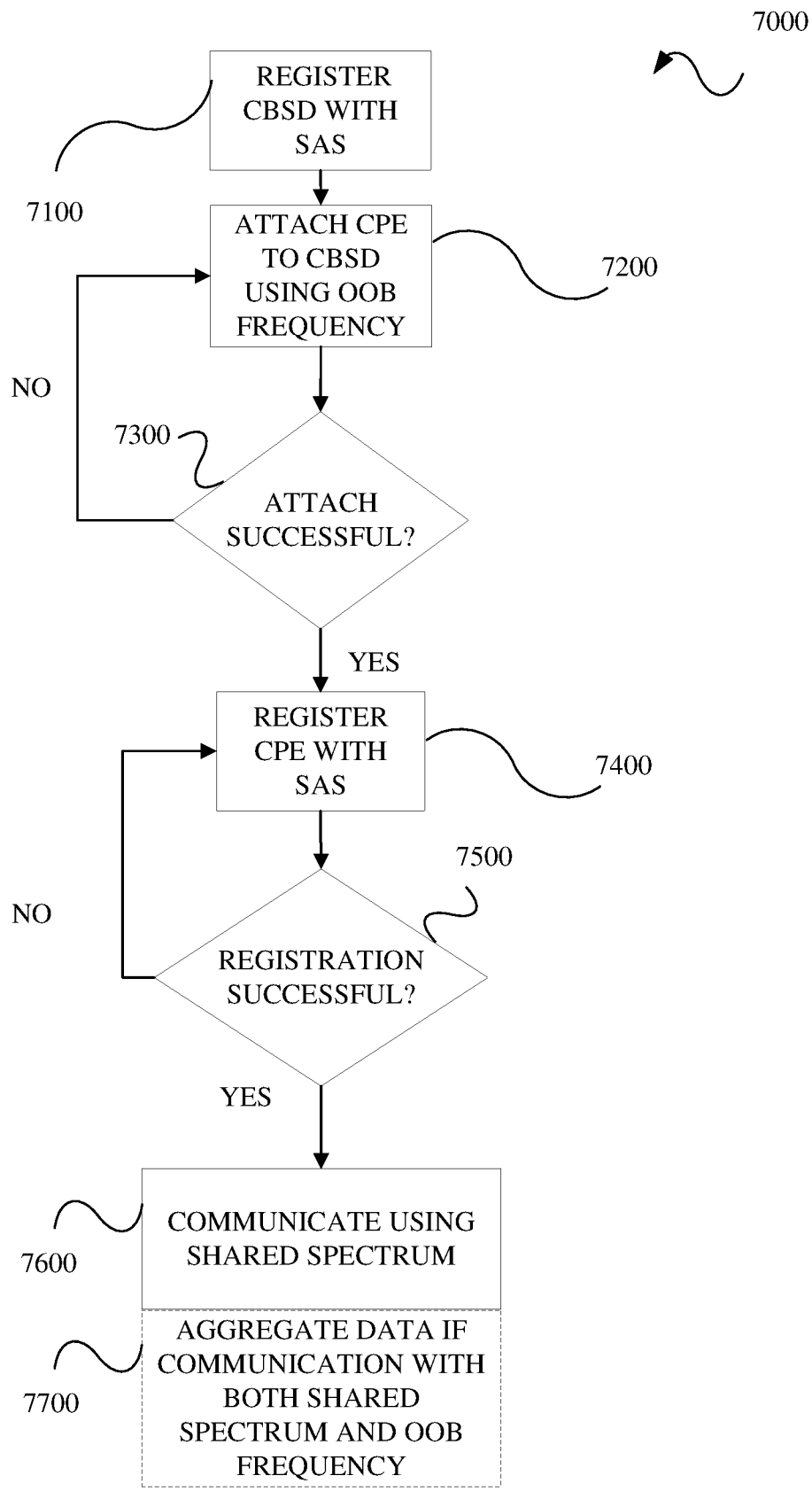
FIG. 7 is a flowchart of an example method for out-of-band attachment and registration and increased link reliability and capacity in accordance with embodiments of this disclosure.

FIG. 7 is a flowchart of an example method 7000 for CPE attachment and registration and increased link reliability and capacity in accordance with embodiments of this disclosure. The method 7000 includes: registering 7100 a CBSD; attaching 7200 a CPE to the CBSD using OOB spectrum; determining 7300 if attachment is successful; registering 7400 CPE with SAS if successful attachment; determining 7500 if registration is successful; communicating 7600 by the CPE on increased transmit power levels if successful registration; and when applicable and/or appropriate, aggregating 7700 shared spectrum data with OOB spectrum data to increase link reliability, capacity, and/or throughput. For example, the technique 7000 may be implemented, as applicable and appropriate, by CBSDs 1110, 1120, and 1130, the SAS 1200, the processor 2100, the processor 3100, the processor 4100, and the CPE 1400.

The method 7000 includes registering 7100 a CBSD. In shared spectrum systems, such as CBRS systems, the CBSD registers with a SAS to receive a spectrum allocation or grant. The CBSD establishes its wireless coverage once it receives the shared spectrum allocation.

The method 7000 includes attaching 7200 a CPE to the CBSD using OOB spectrum. A CPE initially attaches with the registered CBSD using an OOB spectrum to gain access to the shared spectrum. In an implementation, the OOB spectrum may be IMS spectrum, TVWS spectrum, licensed spectrum, unlicensed spectrum, another shared spectrum, and/or the like and as described herein. In an implementation, the CBSD and the CPE may include at least two radio frequency devices. One radio frequency device for operation with the shared spectrum and another radio frequency device for operation with the OOB spectrum.

The method 7000 includes determining 7300 if attachment is successful. If attachment with the CBSD is not successful, then the CPE may try again, try with a different CBSD, or stop.

The method 7000 includes registering 7400 the CPE with SAS if successful attachment. The CPE attempts to register with the SAS as a certain type of shared spectrum device using the OOB spectrum, where different types of shared spectrum devices have different operating characteristics or specifications including transmit power levels, for example. In an implementation, registration using the OOB spectrum can be done via the CBSD. In an implementation, registration using the OOB spectrum can be done via a device which operates on the OOB spectrum. In an implementation, the device may or may not be collocated with the CBSD.

The method 7000 includes determining 7500 if registration is successful. If registration with the SAS is not successful, then the CPE may try again, try attachment with a different CBSD and then try SAS registration again, or stop.

The method 7000 includes communicating 7600 by the CPE on increased transmit power levels if successful registration. The CPE transmits, operates, and/or communicates at a defined transmit power level associated with the shared spectrum device type after successful SAS registration, where the defined transmit power level is greater than a transmit power level associated with pre-SAS registration.

The method 7000 includes when applicable and/or appropriate, aggregating 7700 shared spectrum data with OOB spectrum data to increase link reliability, capacity, and/or throughput. The end user device may continue to transmit, operate, and/or communicate on the OOB spectrum in addition to the shared spectrum. In this instance, data aggregation techniques may be used to combine shared spectrum data and OOB spectrum data to increase link reliability and throughput. In an implementation, the CBSD and the CPE may include a data aggregation device to aggregate the data. In an implementation, the data aggregation device may be a router, switch, and/or the like. In an implementation, carrier aggregation may be used to aggregate the data if the OOB spectrum is a LTE spectrum.

FIG. 8 is a flowchart of an example method 8000 for CPE attachment and registration and increased link reliability and capacity in accordance with embodiments of this disclosure. The method 8000 includes: registering 8100 a CBSD; attaching 8200 CPE to CBSD using shared spectrum; determining 8300 if attachment is successful; attaching 8400 the CPE to CBSD using OOB spectrum if attachment is unsuccessful; determining 8500 if attachment is successful; registering 8600 the CPE with SAS if successful attachment; determining 8700 if registration is successful; communicating 8800 by the CPE on increased transmit power levels if successful registration; and when applicable and/or appropriate, aggregating 8900 shared spectrum data with OOB spectrum data to increase link reliability, capacity, and/or throughput. For example, the technique 8000 may be implemented, as applicable and appropriate, by CBSDs 1110, 1120, and 1130, the SAS 1200, the processor 2100, the processor 3100, the processor 4100, and the CPE 1400.

The method 8000 includes registering 8100 a CBSD. In shared spectrum systems, such as CBRS systems, the CBSD registers with a SAS to receive a spectrum allocation or grant. The CBSD establishes its wireless coverage once it receives the shared spectrum allocation.

The method 8000 includes attaching 8200 a CPE to the CBSD using a shared spectrum. An initial attachment attempt may use the shared spectrum for attachment.

The method 8000 includes determining 8300 if attachment is successful. If attachment with the CBSD is successful, then the CPE attempts to register with the SAS.

The method 8000 includes attaching 8400 the CPE to the CBSD using an OOB spectrum if shared spectrum attachment fails. A CPE attaches with the registered CBSD using an OOB spectrum to gain access to the shared spectrum. In an implementation, the OOB spectrum may be IMS spectrum, TVWS spectrum, licensed spectrum, unlicensed spectrum, another shared spectrum, and/or the like and as described herein. In an implementation, the CBSD and the CPE may include at least two radio frequency devices. One radio frequency device for operation with the shared spectrum and another radio frequency device for operation with the OOB spectrum.

The method 8000 includes determining 8500 if attachment is successful. If attachment with the CBSD is not successful, then the CPE may try again, try with a different CBSD, or stop.

The method 8000 includes registering 8600 the CPE with the SAS if successful attachment. The CPE attempts to register with the SAS as a certain type of shared spectrum device using the OOB spectrum, where different types of shared spectrum devices have different operating characteristics or specifications including transmit power levels, for example. In an implementation, registration using the OOB spectrum can be done via the CBSD. In an implementation, registration using the OOB spectrum can be done via a device which operates on the OOB spectrum. In an implementation, the device may or may not be collocated with the CBSD.

The method 8000 includes determining 8700 if registration is successful. If registration with the SAS is not successful, then the CPE may try again, try attachment with a different CBSD and then try SAS registration again, or stop.

The method 8000 includes communicating 8800 by the CPE on increased transmit power levels if successful registration. The CPE transmits, operates, and/or communicates at a defined transmit power level associated with the shared spectrum device type after successful SAS registration, where the defined transmit power level is greater than a transmit power level associated with pre-SAS registration.

The method 8000 includes when applicable and/or appropriate, aggregating 8900 shared spectrum data with OOB spectrum data to increase link reliability, capacity, and throughput. The CPE may continue to transmit, operate, and/or communicate on the OOB spectrum in addition to the shared spectrum. In this instance, data aggregation techniques may be used to combine shared spectrum data and OOB spectrum data to increase link reliability and throughput. In an implementation, the CBSD and the CPE may include a data aggregation device to aggregate the data. In an implementation, the data aggregation device may be a router, switch, and/or the like. In an implementation, carrier aggregation may be used to aggregate the data if the OOB spectrum is a LTE spectrum.

FIG. 9 is a flowchart of an example method 9000 for CPE attachment and registration and increased link reliability and capacity in accordance with embodiments of this disclosure. The method 9000 includes: attaching 9100 CPE to a CBSD; registering 9200 the CPE with a SAS if successful attachment; communicating 9300 by the CPE on increased transmit power levels if successful registration; and when applicable and/or appropriate, aggregating 9400 shared spectrum data with OOB spectrum data to increase link reliability, capacity, and/or throughput. For example, the technique 9000 may be implemented, as applicable and appropriate, by CBSDs 1110, 1120, and 1130, the SAS 1200, the processor 2100, the processor 3100, the processor 4100, and the CPE 1400.

The method 9000 includes attaching 9100 a CPE to a CBSD. The attaching 9100 may include registering a CBSD with a SAS. In shared spectrum systems, such as CBRS systems, the CBSD registers with a SAS to receive a spectrum allocation or grant. The CBSD establishes its wireless coverage once it receives the shared spectrum allocation. A CPE attaches with the registered CBSD to gain access to the shared spectrum. In an implementation, the CPE may make an initial attempt using the shared spectrum for CBSD attachment. If the initial attempt fails, the CPE may then use an OOB spectrum. In an implementation, the OOB spectrum may be IMS spectrum, TVWS spectrum, licensed spectrum, unlicensed spectrum, other shared spectrum, and the like as described herein. In an implementation, the CBSD and the CPE may include at least two radio frequency devices. One radio frequency device for operation with the shared spectrum and another radio frequency device for operation with the OOB spectrum. If attachment with the CBSD is not successful, then the end user may try again, try with a different AP, or stop.

The method 9000 includes registering 9200 the CPE with a SAS if successful attachment. The CPE attempts to register with the SAS as a certain type of shared spectrum device using the OOB spectrum if applicable, where different types of shared spectrum devices have different operating characteristics or specifications including transmit power levels, for example. If registration with the SAS is not successful, then the CPE may try again, try attachment with a different CBSD and then try SAS registration again, or stop. In an implementation, registration using the OOB spectrum can be done via the CBSD. In an implementation, registration using the OOB spectrum can be done via a device which operates on the OOB spectrum. In an implementation, the device may or may not be collocated with the CBSD.

The method 9000 includes communicating 9300 by the CPE on increased transmit power levels if successful registration. The CPE transmits, operates, and/or communicates at a defined transmit power level associated with the shared spectrum device type after successful SAS registration, where the defined transmit power level is greater than a transmit power level associated with pre-SAS registration.

The method 9000 includes when applicable and/or appropriate, aggregating 9400 shared spectrum data with OOB spectrum data to increase link reliability, capacity, and throughput. The CPE may continue to transmit, operate, and/or communicate on the OOB spectrum in addition to the shared spectrum. In this instance, data aggregation techniques may be used to combine shared spectrum data and OOB spectrum data to increase link reliability, capacity, and/or throughput. In an implementation, the CBSD and the CPE may include a data aggregation device to aggregate the data. In an implementation, the data aggregation device may be a router, switch, and/or the like. In an implementation, carrier aggregation may be used to aggregate the data if the OOB spectrum is a LTE spectrum.

In general, a method for customer premise equipment (CPE) attachment and registration in a shared spectrum system includes attaching, by the CPE to a shared spectrum access point, using an out-of-band spectrum, where the out-of-band spectrum is out-of-band with respect to a shared spectrum of the shared spectrum system, registering, by the CPE with a spectrum access system, using the out-of-band spectrum upon successful attachment with the shared spectrum access point, and communicating, by the CPE, using at least the shared spectrum upon successful registration with the spectrum access system. In an implementation, the method further includes maintaining, by the CPE, communications using the out-of-band spectrum. In an implementation, the method further includes aggregating, by the CPE, shared spectrum data and out-of-band spectrum data to increase link reliability, capacity, and throughput. In an implementation, a post-registration transmit power level is higher than a pre-registration transmit power level with respect to the shared spectrum. In an implementation, the CPE registers as a shared spectrum device type and each shared spectrum device type has a same pre-registration transmit power level and a different post-registration transmit power level. In an implementation, the out-of-band spectrum is one of Industrial, Scientific, and Medical (ISM) spectrum, Television White Space (TVWS) spectrum, a licensed spectrum, an unlicensed spectrum, and a different shared spectrum. In an implementation, the method further includes initially attaching, by the CPE to the shared spectrum access point, using the shared spectrum, and using, by the CPE, the out-of-band spectrum upon unsuccessful attachment to the shared spectrum access point.

In general, a customer premise equipment (CPE) includes a radio configured to operate on a shared spectrum of a shared spectrum system, at least one alternative radio configured to operate on an out-of-band spectrum, wherein the out-of-band spectrum is out-of-band with respect to the shared spectrum of the shared spectrum system, and a processor connected to the radio and the at least one alternative radio. The processor configured to initiate attachment with a shared spectrum access point over the out-of-band spectrum using the at least one alternative radio, register with a spectrum access system over the out-of-band spectrum using the at least one alternative radio upon successful attachment with the shared spectrum access point, and communicate over at least the shared spectrum using the first radio upon successful registration with the spectrum access system. In an implementation, the processor further configured to maintain communications over the out-of-band spectrum using the at least one alternative radio. In an implementation, the processor further configured to aggregate shared spectrum data and out-of-band spectrum data to increase link reliability, capacity, and throughput. In an implementation, the CPE further including a data aggregation device configured to aggregate the shared spectrum data and the out-of-band spectrum data. In an implementation, the data aggregation device is one of a switch or a router. In an implementation, the CPE registers as a shared spectrum device type and each shared spectrum device type has a same pre-registration transmit power level and a different post-registration transmit power level. In an implementation, the out-of-band spectrum is one of Industrial, Scientific, and Medical (ISM) spectrum, Television White Space (TVWS) spectrum, a licensed spectrum, an unlicensed spectrum, and a different shared spectrum. In an implementation, the processor further configured to initially attach to the shared spectrum access point over the shared spectrum using the radio and use the out-of-band spectrum and the at least one alternative radio upon unsuccessful attachment to the shared spectrum access point.

In general, a system for customer premise equipment (CPE) attachment and registration in a shared spectrum system including a shared spectrum access point including a radio configured to operate on a shared spectrum of a shared spectrum system and at least one alternative radio configured to operate on an out-of-band spectrum, where the out-of-band spectrum is out-of-band with respect to the shared spectrum of the shared spectrum system, and a CPE including a radio configured to operate on the shared spectrum of the shared spectrum system, at least one alternative radio configured to operate on the out-of-band spectrum, and a processor connected to the radio of the CPE and the at least one alternative radio of the CPE. The processor configured to initiate attachment with the shared spectrum access point over the out-of-band spectrum using the at least one alternative radio of the CPE and the at least one alternative radio of the shared spectrum access point, register with a spectrum access system upon successful attachment with the shared spectrum access point over the out-of-band spectrum using the at least one alternative radio of the CPE and the at least one alternative radio of the shared spectrum access point, and communicate over at least the shared spectrum upon successful registration with the spectrum access system using the radio of the CPE and the radio of the shared spectrum access point. In an implementation, the processor further configured to maintain, by the CPE, communications using the out-of-band spectrum. In an implementation, the CPE further including a data aggregation device configured to aggregate the shared spectrum data and the out-of-band spectrum data, and the shared spectrum access point further including a data aggregation device configured to aggregate the shared spectrum data and the out-of-band spectrum data. In an implementation, a post-registration transmit power level is higher than a pre-registration transmit power level with respect to the shared spectrum, and where the CPE registers as a shared spectrum device type and each shared spectrum device type has a same pre-registration transmit power level and a different post-registration transmit power level. In an implementation, the out-of-band spectrum is one of Industrial, Scientific, and Medical (ISM) spectrum, Television White Space (TVWS) spectrum, a licensed spectrum, an unlicensed spectrum, and a different shared spectrum.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for end user device attachment and registration in a shared spectrum system, the method comprising:
    registering, of an end user device by a spectrum access system, using an out-of-band spectrum upon successful attachment of the end user device with a shared spectrum access point using the out-of-band spectrum after unsuccessfully attempting to attach using a shared spectrum, wherein an out-of-band spectrum attachment power is greater than a shared spectrum system attachment power for unregistered end user devices; and
    communicating, with the end user device, using at least the shared spectrum upon successful registration,
    wherein a post-registration transmit power level is higher than a pre-registration transmit power level with respect to the shared spectrum.

2. The method of claim 1, wherein the spectrum access system registers the end user device as a shared spectrum device type and each shared spectrum device type has a same pre-registration transmit power level and a different post-registration transmit power level.

3. The method of claim 1, wherein the out-of-band spectrum is one of Industrial, Scientific, and Medical (ISM) spectrum, and a Television White Space (TVWS) spectrum.

4. The method of claim 1, wherein the shared spectrum access point registers with the spectrum access system.

5. The method of claim 1, wherein the registering is done through the shared spectrum access point.

6. A spectrum access system comprising: a memory; and a processor connected to the memory, the processor configured to: register, customer premise equipment, using an out-of-band spectrum upon attachment with a shared spectrum base station using the out-of-band spectrum after a failed attempt to attach using a shared spectrum, wherein an out-of-band spectrum attachment power is greater than a shared spectrum system attachment power for unregistered customer premise equipment; and communicate, with the customer premise equipment, using at least the shared spectrum upon successful registration, wherein a post-registration transmit power level is higher than a pre-registration transmit power level with respect to the shared spectrum.

7. The system of claim 6, wherein the processor is configured to:
    register the customer premise equipment as a shared spectrum device type and each shared spectrum device type has a same pre-registration transmit power level and a different post-registration transmit power level.

8. The system of claim 6, wherein the processor is configured to register the shared spectrum access point with the spectrum access system.

9. The system of claim 6, wherein the processor is configured to communicate via the shared spectrum access point for registration of the customer premise equipment.

10. The system of claim 6, wherein the processor is further configured to:
maintain communications using the out-of-band spectrum.

11. The system of claim 6, wherein the out-of-band spectrum is one of Industrial, Scientific, and Medical (ISM) spectrum, Television White Space (TVWS) spectrum, a licensed spectrum, an unlicensed spectrum, and a different shared spectrum.

12. A shared spectrum access point comprising:
a radio configured to operate on a shared spectrum of a shared spectrum system and at least one alternative radio configured to operate on an out-of-band spectrum, wherein the out-of-band spectrum is out-of-band with respect to the shared spectrum of the shared spectrum system; and
a processor connected to the radio and the at least one alternative radio, the processor configured to:
receive, from an end user device, an attachment attempt over the shared spectrum using the radio using an unregistered device transmission power associated with a shared spectrum system for unregistered devices;
receive, from the end user device, an attachment attempt over the out-of-band spectrum using the at least one alternative radio when the unregistered device transmission power is insufficient to attach to the shared spectrum access point and wherein a transmission power of the at least one alternative radio for the out-of-band spectrum is greater than the unregistered device transmission power;
communicate, from the end user device to the shared spectrum system, a registration attempt over the out-of-band spectrum using the at least one alternative radio; and
communicate, with the end user device, over at least the shared spectrum upon successful registration of the end user device with the spectrum access system using the radio.

13. The shared spectrum access point of claim 12, wherein the processor is further configured to:
maintain communications using the out-of-band spectrum over the at least one alternative radio.

14. The shared spectrum access point of claim 13, further comprising:
a data aggregation device configured to aggregate shared spectrum data and out-of-band spectrum data.

15. The shared spectrum access point of claim 14, wherein the data aggregation device is one of a switch or a router.

16. The shared spectrum access point of claim 12, wherein a post-registration transmit power level is higher than a pre-registration transmit power level with respect to the shared spectrum.

17. The shared spectrum access point of claim 12, wherein registration of the end user device is as a shared spectrum device type and wherein each shared spectrum device type has a same preregistration transmit power level and a different post-registration transmit power level.

18. The shared spectrum access point of claim 12, wherein the out-of-band spectrum is one of Industrial, Scientific, and Medical (ISM) spectrum, Television White Space (TVWS) spectrum, a licensed spectrum, an unlicensed spectrum, and a different shared spectrum.

\* \* \* \* \*